(12) United States Patent
Sun

(10) Patent No.: US 7,961,963 B2
(45) Date of Patent: Jun. 14, 2011

(54) METHODS AND SYSTEMS FOR EXTENDED SPATIAL SCALABILITY WITH PICTURE-LEVEL ADAPTATION

(75) Inventor: Shijun Sun, Vancouver, WA (US)

(73) Assignee: Sharp Laboratories of America, Inc., Camas, WA (US)

(*) Notice: Subject to any disclaimer, the term of this patent is extended or adjusted under 35 U.S.C. 154(b) by 546 days.

(21) Appl. No.: 11/350,000

(22) Filed: Feb. 7, 2006

(65) Prior Publication Data
US 2006/0209959 A1  Sep. 21, 2006

Related U.S. Application Data

(60) Provisional application No. 60/663,161, filed on Mar. 18, 2005, provisional application No. 60/683,060, filed on May 20, 2005, provisional application No. 60/686,676, filed on Jun. 1, 2005.

(51) Int. Cl.
 *G06K 9/46* (2006.01)
(52) U.S. Cl. ............ 382/240; 341/50; 375/240.08; 375/240.16
(58) Field of Classification Search .......... 382/240; 341/50; 375/240.08, 240.16
See application file for complete search history.

(56) References Cited

U.S. PATENT DOCUMENTS

| | | | |
|---|---|---|---|
| 5,182,645 A | 1/1993 | Breeuwer et al. | |
| 6,057,884 A * | 5/2000 | Chen et al. | 375/240.16 |
| 6,728,317 B1 * | 4/2004 | Demos | 375/240.21 |
| 2002/0090028 A1 | 7/2002 | Comer et al. | |
| 2007/0118794 A1 * | 5/2007 | Hollander et al. | 715/512 |

OTHER PUBLICATIONS

Edouard Francois, Extended spatial scalability, International Organisation for Standardisation Organisation Internationale DE Normalisation,ISO/IEC JTC1/SC29/WG11, Coding of Moving Pictures and Audio, ISO/IEC JTC1/SC29/WG11, MPEG2005/M11669, Jan. 2005, Hong Kong, China.
International Organisation for Standardisation, Organisation Internationale DE Normalisation, Coding of Moving Pictures and Audio. ISO/IEC JTC1/SC29/WG11/N6898, Hong Kong, Jan. 2005.
Joint Video Team (JVT) of ISO/IEC MPEG & ITU-T VCEG, (ISO/IEC JTC1/SC29/WG11 and ITU-T SG16 Q.6), Working Draft 1.0 of 14496-10:200x/AMD1 Scalable Video Coding International Organization for Standardization,Organisation Internationale Normalisation, Coding of Moving Pictures and Audio, ISO/IEC JTC 1/SC 29/WG 11 N6901, Jan. 2005, Hong Kong, China *relevant sections 5 and 6*.
Ken Turkowski, "Filters for Common Resampling Tasks", Graphics Gems I, Academic Press, Apple Computer, Apr. 1990.
Chinese Office Action 2006-80016560 corresponding to U.S. Appl. No. 11/347,539 which has technical similarities to the present application.
U.S. Appl. No. 11/530,853—Final Office Action dated Feb. 6, 2009.
U.S. Appl. No. 11/530,853—Non-Final Office Action dated Sep. 22, 2008.

(Continued)

*Primary Examiner* — Vikkram Bali
*Assistant Examiner* — Eueng-Nan Yeh
(74) *Attorney, Agent, or Firm* — Krieger Intellectual Property, Inc.; Scott C. Krieger

(57) ABSTRACT

Embodiments of the present invention comprise systems and methods for modification of motion vectors in spatial scalable video coding. Some embodiments of the present invention comprise methods and systems designed for use with the Scalable Video Coding extension of H.264/MPEG-4 AVC.

20 Claims, 3 Drawing Sheets

OTHER PUBLICATIONS

S. Sun, and E. Francois, "Extended Spatial Scalability with Picture-Level Adaptation", Joint Video Team (JVT) of ISO/IEC MPEG & ITU-T VCEG (ISO/IEC JTC1/SC29WG11 and ITU-T SG16 Q.6) 15$^{th}$ Meeting: Busan, DR, Apr. 16-22, 2005.

S. Sun, "Upsampling Filter Design with Cubic Splines", Joint Video Team (JVT) of ISO/IEC MPEG & ITU-T VCEG (ISO/IEC JTC1/SC29/WG11 and ITU-T SG16 Q.6) 19$^{th}$ Meeting: Geneva, Switzerland, Mar. 31-Apr. 7, 2006.

Gary Sullivan, "Resampling filters for SVC Upsampling", JVT-R066, Joint Video Team (JVT) of ISO/IEC MPEG & ITU-T VCEG 18$^{th}$ Meeting, Bangkok, Jan. 2006.

J. Vieron, E. Francois and V. Bottreau, "CE 2: Interlaced coding", JVT-S302, Joint Video Team (JVT) of ISO/IEC MPEG & ITU-T VCEG 19$^{th}$ Meeting, Geneva, Apr. 2006.

E. Francois and J. Vieron, "Core Experiments on Extended Spatial Scalability (CE-6)", JVT P306, Joint Video Team (JVT) of ISO/IEC MPEG & ITU-T VCEG 16$^{th}$ Meeting, Poznan, Jul. 2005.

* cited by examiner

US 7,961,963 B2

METHODS AND SYSTEMS FOR EXTENDED SPATIAL SCALABILITY WITH PICTURE-LEVEL ADAPTATION

RELATED REFERENCES

This application claims the benefit of U. S. Provisional Patent Application No. 60/663,161, entitled "Extended spatial scalability with picture-level adaptation," filed Mar. 18, 2005, invented by Shijun Sun; this application also claims the benefit of U.S. Provisional Patent Application No. 60/683,060, entitled "Direct interpolation for up-sampling in extended spatial scalability," filed May 20, 2005, invented by Shijun Sun; and this application also claims the benefit of U.S. Provisional Patent Application No. 60/686,676, entitled "Deblocking Filter Method with Reduced Complexity for Spatial Scalable Video Coding," filed Jun. 1, 2005, invented by Shijun Sun.

FIELD OF THE INVENTION

Embodiments of the present invention comprise methods and systems for extended spatial scalability with picture-level adaptation. Some embodiments of the present invention comprise methods and systems for scaling and adjusting motion vectors for use in picture layer prediction.

BACKGROUND

H.264/MPEG-4 AVC [Joint Video Team of ITU-T VCEG and ISO/IEC MPEG, "Advanced Video Coding (AVC)—4$^{th}$ Edition," ITU-T Rec. H.264 and ISO/IEC 14496-10 (MPEG4-Part 10), January 2005], which is incorporated by reference herein, is a video codec specification that uses macroblock prediction followed by residual coding to reduce temporal and spatial redundancy in a video sequence for compression efficiency. Spatial scalability refers to a functionality in which parts of a bitstream may be removed while maintaining rate-distortion performance at any supported spatial resolution. Single-layer H.264/MPEG-4 AVC does not support spatial scalability. Spatial scalability is supported by the Scalable Video Coding (SVC) extension of H.264/MPEG-4 AVC.

The SVC extension of H.264/MPEG-4 AVC [Working Document 1.0 (WD-1.0) (MPEG Doc. N6901) for the Joint Scalable Video Model (JSVM)], which is incorporated by reference herein, is a layered video codec in which the redundancy between spatial layers is exploited by inter-layer prediction mechanisms. Three inter-layer prediction techniques are included into the design of the SVC extension of H.264/MPEG-4 AVC: inter-layer motion prediction, inter-layer residual prediction, and inter-layer intra texture prediction.

Block based motion compensated video coding is used in many video compression standards such as H.261, H.263, H264, MPEG-1, MPEG-2, and MPEG-4. The lossy compression process can create visual artifacts in the decoded images, referred to as image artifacts. Blocking artifacts occur along the block boundaries in an image and are caused by the coarse quantization of transform coefficients.

Image filtering techniques can be used to reduce artifacts in reconstructed images. Reconstructed images are the images produced after being inverse transformed and decoded. The rule of thumb in these techniques is that image edges should be preserved while the rest of the image is smoothed. Low pass filters are carefully chosen based on the characteristic of a particular pixel or set of pixels surrounding the image edges. Non-correlated image pixels that extend across image block boundaries are specifically filtered to reduce blocking artifacts. However, this filtering can introduce blurring artifacts into the image. If there are little or no blocking artifacts between adjacent blocks, then low pass filtering needlessly incorporates blurring into the image while at the same time wasting processing resources.

Previously, only dyadic spatial scalability was addressed by SVC. Dyadic spatial scalability refers to configurations in which the ratio of picture dimensions between two successive spatial layers is a power of 2. New tools that manage configurations in which the ratio of picture dimensions between successive spatial layers is not a power of 2 and in which the pictures of the higher level can contain regions that are not present in corresponding pictures of the lower level, referred to as non-dyadic scaling with cropping window, have been proposed.

All of the inter-layer prediction methods comprise picture up-sampling. Picture up-sampling is the process of generating a higher resolution image from a lower resolution image. Some picture up-sampling processes comprise sample interpolation. The prior up-sampling process used in the SVC design was based on the quarter luma sample interpolation procedure specified in H.264 for inter prediction. When applied to spatially scalable coding, the prior method has the following two drawbacks: the interpolation resolution is limited to quarter samples, and thus, is not supportive of non-dyadic scaling; and half-sample interpolation is required in order to get a quarter-sample position making this method computationally cumbersome. A picture up-sampling process that overcomes these limitations is desired.

SUMMARY

Embodiments of the present invention comprise methods and systems for image encoding and decoding. Some embodiments of the present invention comprise methods and systems for predicting a spatially-scalable picture layer based on another picture layer. Some embodiments comprise methods and systems for adjusting and scaling a picture motion vector to account for cropping window size and movement.

The foregoing and other objectives, features, and advantages of the invention will be more readily understood upon consideration of the following detailed description of the invention taken in conjunction with the accompanying drawings.

DETAILED DESCRIPTION OF EXEMPLARY EMBODIMENTS

Figure 1:
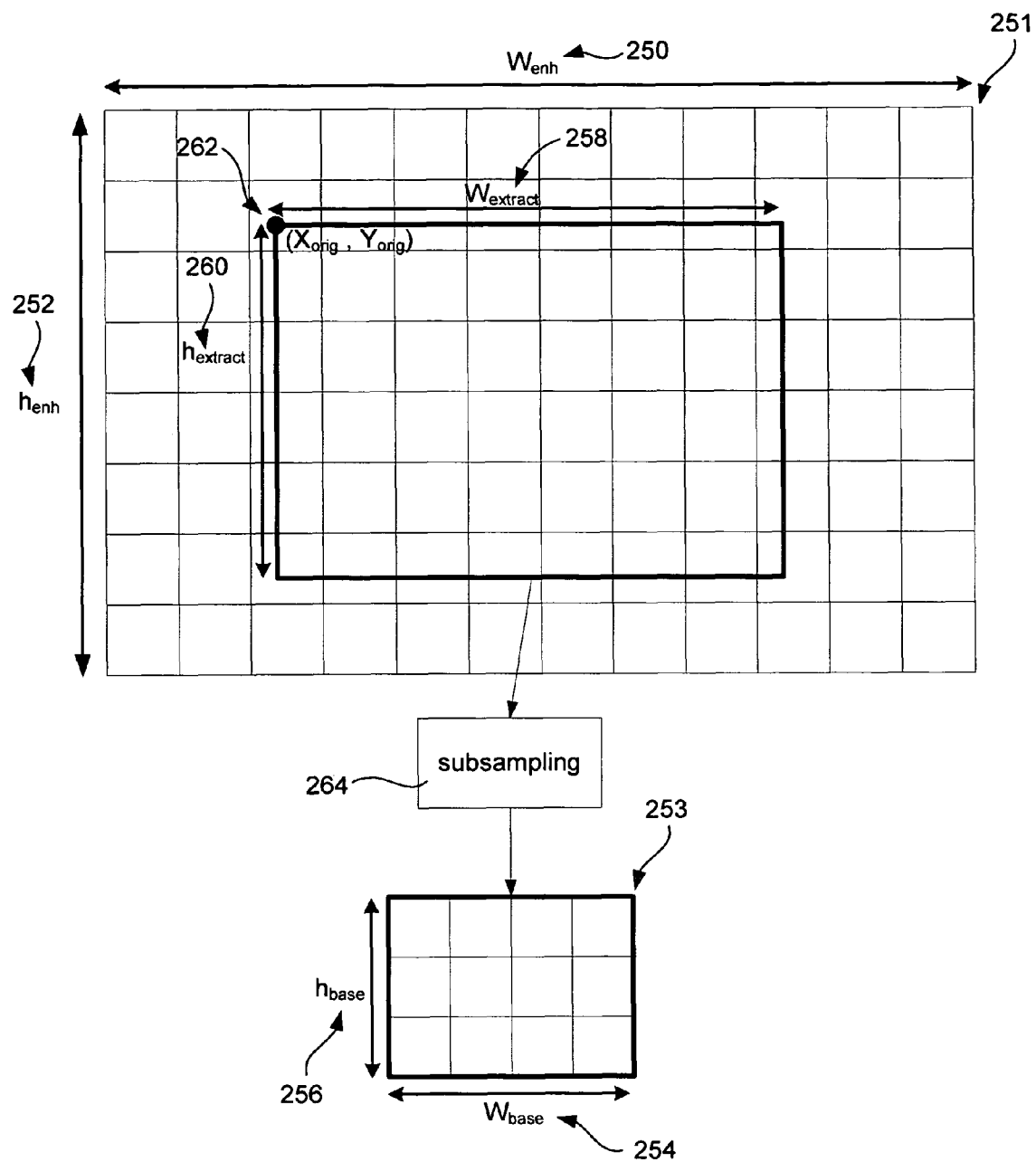
FIG. 1 is a diagram showing the geometric relationship between a base spatial layer and an enhancement spatial layer in some embodiments of the present invention.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention relate to the Scalable Video Coding Extension of H.264/AVC. Some embodiments relate to filtering to address a problem of picture upsampling for spatial scalable video coding. More specifically, some embodiments of the present invention provide an upsampling procedure that is designed for the Scalable Video Coding extension of H.264/MPEG-4 AVC, especially for the Extended Spatial Scalable (ESS) video coding feature adopted in April 2005 by JVT (Joint Video Team of MPEG and VCEG).

Currently, JSVM WD-1.0 [MPEG Doc. N6901], which is incorporated by reference herein, only addresses dyadic spatial scalability, that is, configurations where the ratio between picture width and height (in terms of number of pixels) of two successive spatial layers equals 2. This obviously will be a limitation on more general applications, such as SD to HD scalability for broadcasting.

A tool has been proposed, [MPEG Doc. m11669], which is incorporated by reference herein, that provides extended spatial scalability, that is, managing configurations in which the ratio between picture width and height of two successive spatial layers is not necessarily equal to a power of 2 and pictures of a higher level can contain regions (typically around picture borders) that are not present in corresponding pictures of a lower level. This proposal [MPEG Doc. m11669] extended inter-layer prediction of WD-1.0 [MPEG Doc. N6901] for more generic cases where the ratio between the higher layer and lower layer picture dimensions is not a power of 2.

Embodiments of the present invention provide a method that applies the extended spatial scalability, i.e., non-dyadic scaling with cropping window, to picture level that will better fit the need of more general applications. To support the picture-level adaptation of spatial scalability, embodiments of the present invention provide a further refinement of the inter-layer prediction method heretofore proposed. Additionally, several issues that were not addressed by the prior proposal are also addressed in these embodiments.

For the purposes of this specification and claims, the term "picture" may comprise an array of pixels, a digital image, a subdivision of a digital image, a data channel of a digital image or another representation of image data.

FIG. 1 shows two pictures corresponding to an image picture:

Embodiments of the present invention relate to two or more successive spatial layers, a lower layer (considered as base layer) 253 and a higher layer (considered as enhancement layer) 251. These layers may be linked by the following geometrical relations (shown in FIG. 1). Width 250 and height 252 of enhancement layer pictures may be defined as $w_{enh}$ and $h_{enh}$, respectively. In the same way, dimensions of a base layer picture may be defined as $w_{base}$ 254 and $h_{base}$ 256. The base layer 253 may be a subsampled 264 version of a sub-region of an enhancement layer picture 251, of dimensions $w_{extract}$ 258 and $h_{extract}$ 260, positioned at coordinates 262 ($x_{orig}$, $y_{orig}$) in the enhancement layer picture coordinate system. Parameters ($x_{orig}$, $y_{orig}$, $w_{extract}$, $h_{extract}$, $w_{base}$, $h_{base}$) define the geometrical relations between a higher layer picture 251 and a lower layer picture 253.

Figures 2, 3:
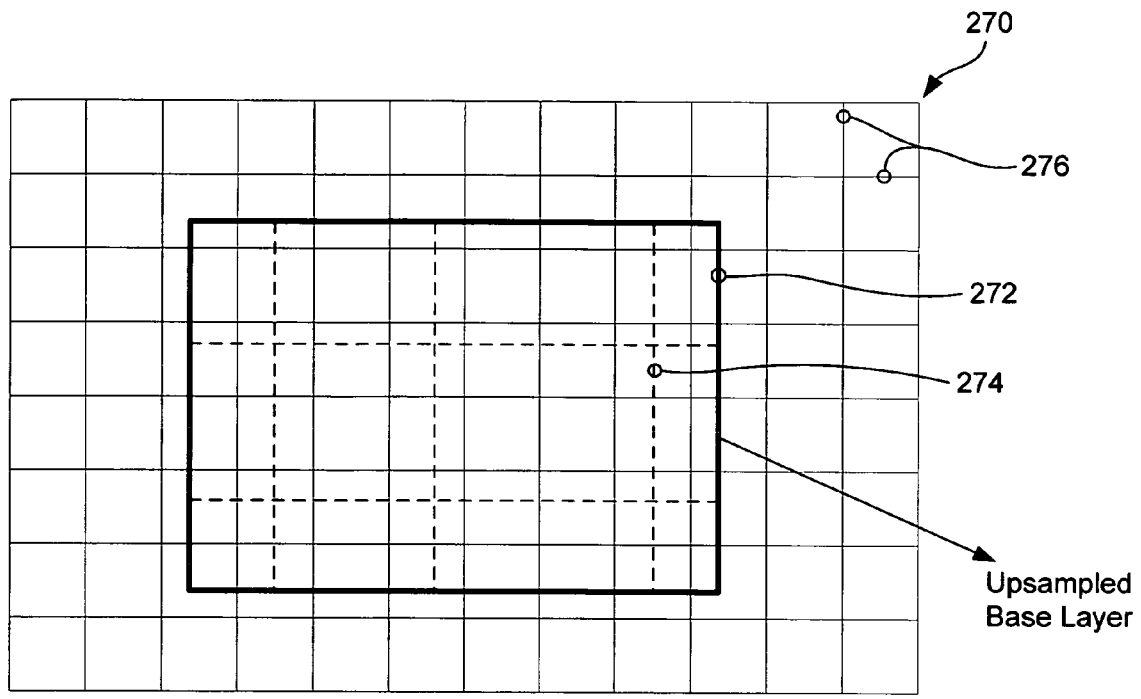
FIG. 2 is a diagram showing the geometric relationship between an upsampled base layer picture and an enhancement layer picture of some embodiments of the present invention.
FIG. 3 is a diagram showing pixels of a 4×4 block.

A problem addressed by embodiments of the present invention is the encoding/decoding of macroblocks of the enhancement layer knowing the decoded base layer. A macroblock of an enhancement layer may have either no base layer corresponding block (on borders of the enhancement layer picture) or one to several base layer corresponding macroblocks, as illustrated in FIG. 2. Consequently, a different managing of the inter layer prediction than in WD-1.0 [MPEG Doc. N6901] is necessary. FIG. 2 illustrates macroblock overlapping between an upsampled base layer picture 272, wherein macroblock boundaries are marked by dashed lines 274 and an enhancement layer picture 270, wherein macroblock boundaries are marked by solid lines 276.

It has been proposed that [MPEG Doc. m11669], $w_{extract}$ and $h_{extract}$ be constrained to be a multiple of 16. This constraint limits the picture-level adaptation. Instead, embodiments of the present invention restrict $w_{extract}$ and $h_{extract}$ to be a multiple of 2. Embodiments of the present invention may further require $x_{orig}$ and $y_{orig}$ to be a multiple of 2 in order to avoid the complexity in adjusting for possible phase shift in chroma up/down sampling. The chroma-phase shift problem has not been previously addressed.

The dimensions and other parameters illustrated in FIG. 1 may be represented by the following symbols or variable names.

scaled_base_left_offset=$x_{orig}$
scaled_base_top_offset=$y_{orig}$
scaled_base_right_offset=$w_{enh}$-$x_{orig}$-$w_{extract}$
scaled_base_bottom_offset=$h_{enh}$-$y_{orig}$-$h_{extract}$
scaled_base_width=$w_{extract}$
scaled_base_height=$h_{extract}$ Inter-Layer Motion Prediction A given high layer macroblock can exploit inter-layer prediction using scaled base layer motion data using either "BASE_LAYER_MODE" or "QPEL_REFINEMENT_MODE". As in WD-1.0 [MPEG Doc. N6901], these macroblock modes indicate that the motion/prediction information including macroblock partitioning is directly derived from the base layer. A prediction macroblock, MB_pred, can be constructed by inheriting motion data from a base layer. When using "BASE_LAYER_MODE", the macroblock partitioning, as well as the reference indices and motion vectors, are those of the prediction macroblock MD_pred. "QPEL_REFINEMENT_MODE" is similar, but with a quarter-sample motion vector refinement.

It has been proposed to derive MB_pred in the following four steps:
  for each 4×4 block of MB_pred, inheritance of motion data from the base layer motion data,
  partitioning choice for each 8×8 block of MB_pred,
  mode choice for MB_pred, and
  motion vector scaling.

However, embodiments of the present invention provide modifications in several equations to support picture-level adaptation.

4×4 Block Inheritance

FIG. 3 illustrates a 4×4 block b 280 with four corners 281, 282, 283 and 284. The process consists of checking each of the four corners of the block 281, 282, 283 and 284. Let (x, y) be the position of a corner pixel c in the high layer coordinate system. Let ($x_{base}$, $y_{base}$) be the corresponding position in the base layer coordinate system, defined as follows:

$$\begin{cases} x_{base} = \dfrac{[(x - x_{orig}) \cdot w_{base} + w_{extract}/2]}{w_{extract}} \\ y_{base} = \dfrac{[(y - y_{orig}) \cdot h_{base} + h_{extract}/2]}{h_{extract}} \end{cases} \quad (1)$$

The co-located macroblock of pixel (x, y) is then the base layer macroblock that contains pixel ($x_{base}$, $y_{base}$). In the same way, the co-located 8×8 block of pixel (x, y) is the base layer 8×8 block containing pixel ($x_{base}$, $y_{base}$) and the co-located 4×4 block of pixel (x, y) is the base layer 4×4 block containing pixel ($x_{base}$, $y_{base}$).

The motion data inheritance process for b may be described as follows:
for each corner c, the reference index r(c,listx) and motion vector mv(c, listx) of each list listx (listx=list0 or list1) are set to those of the co-located base layer 4×4 block
for each corner, if the co-located macroblock does not exist or is in intra mode, then b is set as an intra block
else, for each list listx
if none of the corners uses this list, no reference index and motion vector for this list is set to b
else
the reference index $r_b$(listx) set for b is the minimum of the existing reference indices of the 4 corners:

$$r_b(listx) = \min_c(r(c, listx)) \quad (2)$$

the motion vector $mv_b$(listx) set for b is the mean of existing motion vectors of the 4 corners, having the reference index $r_b$(listx).

8×8 Partitioning Choice

Figure 4:
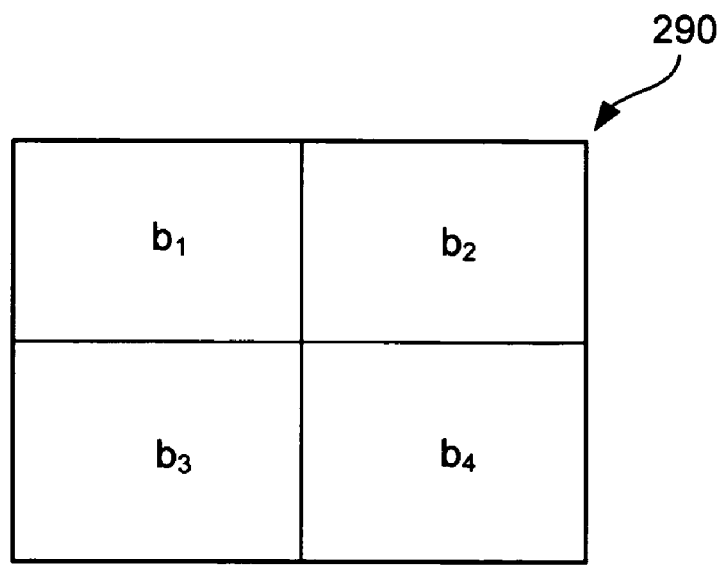
FIG. 4 is a diagram showing 4×4 blocks within an 8×8 block.

Once each 4×4 block motion data has been set, a merging process is necessary in order to determine the actual partitioning of the 8×8 block it belongs to and to avoid forbidden configurations. In the following, 4×4 blocks of an 8×8 block are identified as indicated in FIG. 4.

For each 8×8 block B, the following process may be applied:
if the 4 4×4 blocks have been classified as intra blocks, B is considered as an intra block.
else, B partitioning choice is achieved:
The following process for assigning the same reference indices to each 4×4 block is applied: for each list listx
if no 4×4 block uses this list, no reference index and motion vector of this list are set to B
else
reference index $r_B$(listx) for B is computed as the minimum of the existing reference indices of the 4 4×4 blocks:

$$r_B(listx) = \min_b(r_b(listx)) \quad (3)$$

mean motion vector $mv_{mean}$(listx) of the 4×4 blocks having the same reference index $r_B$(listx) is computed 4×4 blocks (1) classified as intra blocks or (2) not using this list or (3) having a reference index $r_b$(listx) different from $r_B$(listx) are enforced to have $r_B$(listx) and $mv_{mean}$(listx) as reference index and motion vector.

Figure 5:
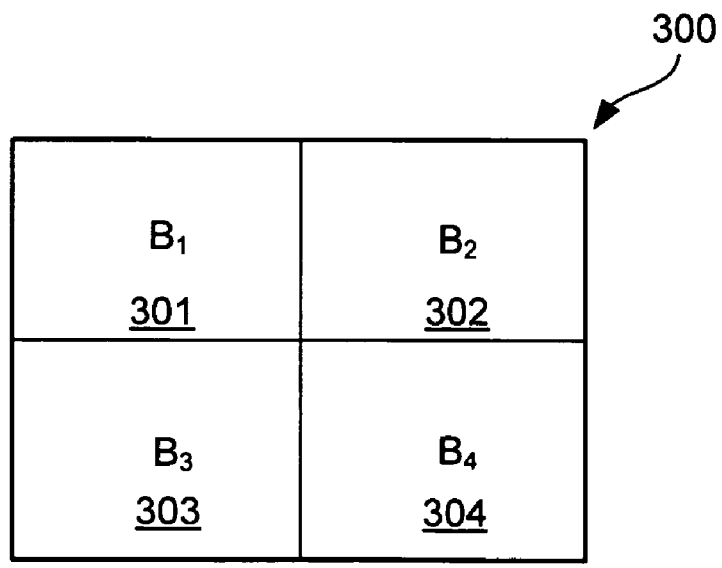
FIG. 5 is a diagram showing 8×8 blocks of a prediction macroblock.

Then the choice of the partitioning mode for B is achieved. Two 4×4 blocks are considered as identical if their motion vectors are identical. The merging process is applied as follows:
if $b_1$ is identical to $b_2$ and $b_3$ is identical to $b_4$ then
if $b_1$ is identical to $b_3$ then BLK__8×8 is chosen
else BLK__8×4 is chosen
else if $b_1$ is identical to $b_3$ and $b_2$ is identical to $b_4$ then
BLK__4×8 is chosen
else BLK__4×4 is chosen Prediction Macroblock Mode Choice In some embodiments, a process may be achieved to determine an MB_pred mode. In the following, 8×8 blocks 301-304 of the macroblock 300 are identified as indicated in FIG. 5.

Two 8×8 blocks are considered as identical blocks if:
One or both of the two 8×8 blocks are classified as intra blocks
or
Partitioning mode of both blocks is BLK__8×8 and reference indices and motion vectors of list0 and list1 of each 8×8 block, if they exist, are identical.

The mode choice is done using the following process:
if all 8×8 blocks are classified as intra blocks, then MB_pred is classified as INTRA macroblock
else, MB_pred is an INTER macroblock. Its mode choice is achieved as follows:
8×8 blocks classified as intra are enforced to BLK__8×8 partitioning. Their reference indices and motion vectors are computed as follows. Let $B_{INTRA}$ be such a 8×8 block.
for each list listx
if no 8×8 block uses this list, no reference index and motion vector of this list is assigned to $B_{INTRA}$
else, the following steps are applied:
a reference index $r_{min}$(listx) is computed as the minimum of the existing reference indices of the 8×8 blocks:

$$r_{min}(listx) = \min_B(r_B(listx)) \quad (4)$$

a mean motion vector $mv_{mean}$(listx) of the 4×4 blocks having the same reference index $r_{min}$(listx) is computed $r_{min}$(listx) is assigned to $B_{INTRA}$ and each 4×4 block of $B_{INTRA}$ is enforced to have $r_{min}$(listx) and $mv_{mean}$(listx) as reference index and motion vector.

Then the choice of the partitioning mode for B is achieved. Two 8×8 blocks are considered as identical if their Partitioning mode is BLK__8×8 and reference indices and motion vectors of list0 and list1 of each 8×8 block, if they exist, are identical. The merging process is applied as follows:
if B1 is identical to B2 and B3 is identical to B4 then
if B1 is identical to B3 then MODE__16×16 is chosen.

else MODE_16×8 is chosen.
    else if B1 is identical to B3 and B2 is identical to B4 then MODE_8×16 is chosen.
        else MODE_8×8 is chosen.

Motion Vectors Scaling

A motion vector rescaling may be applied to every existing motion vector of the prediction macroblock MB_pred as derived above. A Motion vector $mv=(d_x, d_y)$ may be scaled in the vector $mv_s=(d_{sx}, d_{sy})$ using the following equations:

$$\begin{cases} d_{sx} = \dfrac{(d_x \cdot w_{extract} + \text{sign}[d_x] \cdot w_{base}/2)}{w_{base} + 4 \cdot (x_{orig,r} - x_{orig})} \\ d_{sy} = \dfrac{(d_y \cdot h_{extract} + \text{sign}[d_y] \cdot h_{base}/2)}{h_{base} + 4 \cdot (y_{orig,r} - y_{orig})} \end{cases} \quad (5)$$

in which sign[x] is equal to 1 when x is positive, (−1) when x is negative, and 0 when x equals 0. The symbols with subscript "r" represent the geometrical parameters of the corresponding reference picture (e.g., $x_{orig,r}$ and $y_{orig,r}$ are the coordinates for the origin of the reference picture from which prediction occurs.

Inter-Layer Texture Prediction

Texture Upsampling

In some embodiments of the present invention, inter layer texture prediction may be based on the same principles as inter layer motion prediction. Base layer texture upsampling may be achieved applying the two-lobed or three-lobed Lanczos-windowed sinc functions. These filters are considered to offer the best compromise in terms of reduction of aliasing, sharpness, and minimal ringing. The two-lobed Lanczos-windowed sinc function may be defined as follows:

$$Lanczos2(x) = \begin{cases} \dfrac{\sin(\pi x)}{\pi x} \dfrac{\sin\left(\pi \frac{x}{2}\right)}{\pi \frac{x}{2}}, & |x| < 2 \\ 0, & |x| \geq 2 \end{cases} \quad (6)$$

This upsampling step may be processed either on the full frame or block by block. For Intra texture prediction, repetitive padding is used at frame boundaries. For residual prediction, repetitive padding is used at block boundaries (4×4 or 8×8 depending on the transform).

In an exemplary embodiment, according to the Lanczos2 function, the following 16 4-tap upsampling filters are defined in Table 1 below for the 16 different interpolation phases in units of one-sixteenth sample spacing relative to the sample grid of corresponding component in the base layer picture.

For a luma sample in the current layer at position (x, y), the phase shift relative to the corresponding samples in the base layer picture shall be derived as:

$$\begin{cases} p_{x,L} = \dfrac{[(x - x_{orig}) \cdot w_{base} \cdot 16]}{w_{extract} - 16 \cdot \left[\dfrac{(x - x_{orig}) \cdot w_{base}}{w_{extract}}\right]} \\ p_{y,L} = \dfrac{[(y - y_{orig}) \cdot h_{base} \cdot 16]}{h_{extract} - 16 \cdot \left[\dfrac{(y - y_{orig}) \cdot h_{base}}{h_{extract}}\right]} \end{cases} \quad (7)$$

TABLE 1

4-tap interpolation filters for upsampling

| phase | e[−1] | e[0] | e[1] | e[2] |
|---|---|---|---|---|
| 0 | 0 | 128 | 0 | 0 |
| 1 | −4 | 127 | 5 | 0 |
| 2 | −8 | 124 | 13 | −1 |
| 3 | −10 | 118 | 21 | −1 |
| 4 | −11 | 111 | 30 | −2 |
| 5 | −11 | 103 | 40 | −4 |
| 6 | −10 | 93 | 50 | −5 |
| 7 | −9 | 82 | 61 | −6 |
| 8 | −8 | 72 | 72 | −8 |
| 9 | −6 | 61 | 82 | −9 |
| 10 | −5 | 50 | 93 | −10 |
| 11 | −4 | 40 | 103 | −11 |
| 12 | −2 | 30 | 111 | −11 |
| 13 | −1 | 21 | 118 | −10 |
| 14 | −1 | 13 | 124 | −8 |
| 15 | 0 | 5 | 127 | −4 |

For a chroma sample in the current layer at position $(x_c, y_c)$ in the chroma sample coordinate system, the phase shift relative to the corresponding samples in the base layer picture may be derived as:

$$\begin{cases} p_{x,c} = \dfrac{[(x_c - x_{orig,c}) \cdot w_{base,c} \cdot 16]}{w_{extract,c} - 16 \cdot \left[\dfrac{(x_c - x_{orig,c}) \cdot w_{base,c}}{w_{extract,c}}\right]} \\ p_{y,c} = \dfrac{[(y_c - y_{orig,c}) \cdot h_{base,c} \cdot 16]}{h_{extract,c} - 16 \cdot \left[\dfrac{(y_c - y_{orig,c}) \cdot h_{base,c}}{h_{extract,c}}\right]} \end{cases} \quad (8)$$

in which $w_{base,c} = w_{base} \cdot \text{BasePicMbWidthC}/16$     (9)

$w_{extract,c} = w_{extract} \cdot \text{MbWidthC}/16$     (10)

$h_{base,c} = h_{base} \cdot \text{BasePicMbHeightC}/16$     (11)

$h_{extract,c} = h_{extract} \cdot \text{MbheightC}/16$     (12)

$x_{orig,c} = x_{orig} \cdot \text{MbWidthC}/16$     (13)

$y_{orig,c} = y_{orig} \cdot \text{MbHeightC}/16$     (14)

According to each phase shift derived, a 4-tap filter can be chosen from Table 1 for interpolation.

Inter-Layer Intra Texture Prediction

In WD-1.0 [MPEG Doc. N6901], the I_BL mode requires all the corresponding base-layer macroblocks to be intra-coded. In embodiments of the present invention the requirement may be relaxed to allow that the corresponding base-layer macroblocks be inter-coded or not-existing.

For generating the intra prediction signal for macroblocks coded in I_BL mode, the co-located blocks (if any) of the base layer signals are directly de-blocked and interpolated. For 4 input samples (X[n−1], X[n], X[n+1], X[n+2]), the output value Y of a 4-tap interpolation filter shall be derived as:

$Y = \text{Clip1}_Y((e[-1]X[n-1] + e[0]X[n] + e[1]X[n+1] + e[2]X[n+2] + 64)/128)$     (15)

with $\text{Clip1}_Y(x) = \min(\max(0, x), (1 << \text{BitDepth}_Y) - 1)$ in which $\text{BitDepth}_Y$ represents the bit depth of the luma channel data, for luma sample, or $$Y=\text{Clip1}_C((e[-1]X[n-1]+e[0]X[n]+e[1]X[n+1]+e[2]X[n+2]+64)/128) \qquad (16)$$

with $$\text{Clip1}_C(x)=\min(\max(0, x),(1<<\text{BitDepth}_C)-1) \qquad$$

in which $\text{BitDepth}_C$ represents the bit depth of the chroma channel data, for Chroma sample.

Because rounding operations are applied in Equations 15 and 16, the filtering order may be specified as horizontally first or vertically first. It is recommended that filter operations are performed in the horizontal direction first and then followed by filter operations in the vertical direction. This upsampling process is invoked only when extended_spatial_scalability, defined below, is enabled.

After the upsampling filter operation, constant values shall be used to fill the image regions outside of the cropping window. The constant shall be $(1<<(\text{BitDepth}_Y-1))$ for luma or $(1<<(\text{BitDepth}_C-1))$ for chroma.

Inter-Layer Residual Prediction

Similar to Inter-Layer Intra Texture Prediction, the same 4-tap filters, or other filters, may be applied when upsampling the base layer residuals, but with different rounding and clipping functions from that in Equations 15 and 16.

For 4 input residual samples (X[n−1], X[n], X[n+1], X[n+2]), the output value Y of the filter shall be derived as:

$$Y=\text{Clip1}_{Y,r}((e[-1]X[n-1]+e[0]X[n]+e[1]X[n+1]+e[2]X[n+2])/128) \qquad (17)$$

for luma residual sample, or $$Y=\text{Clip1}_{C,r}((e[-1]X[n-1]+e[0]X[n]+e[1]X[n+1]+e[2]X[n+2])/128) \qquad (18)$$

for Chroma residual sample.

The clipping functions for residual upsampling are defined as:

$$\text{Clip1}_{Y,r}(x)=\text{Clip3}(1-(1<<\text{BitDepth}_Y), (1<<\text{BitDepth}_Y)-1, x) \qquad (19)$$

$$\text{Clip1}_{C,r}(x)=\text{Clip3}(1-(1<<\text{BitDepth}_C), (1<<\text{BitDepth}_C)-1, x) \qquad (20)$$

where $\text{Clip3}(a, b, x)=\min(\max(a,x), b)$.

Similarly, after the upsampling filter operation, constant values shall be used to fill the pixel positions where residual prediction is not available, including image regions outside of the cropping window. The constant shall be 0 for all color components.

Changes in Syntax and Semantics
Syntax in Tabular Form

Embodiments of the present invention may utilize the following changes are indicated below in large bold text. The main changes are the addition in the sequence parameter set of a symbol, extended_spatial_scalability, and accordingly four parameters:

scaled_base_left_offset_divided_by_two,
scaled_base_top_offset_divided_by_two,
scaled_base_right_offset_divided_by_two,
scaled_base_bottom_offset_divided_by_two in sequence parameter set and slice_data_in_scalable_extension( ) related to the geometrical transformation to be applied in the base layer upsampling process.

Sequence Parameter Set Syntax in Scalable Extension

| seq_parameter_set_rbsp( ) { | C | Descriptor |
|---|---|---|
| ...... | ... | ... |
|   extended_spatial_scalability | 0 | u(2) |
|   if( extended_spatial_scalability == 1 ) { | | |
|     scaled_base_left_offset_divided_by_two | 0 | ue(v) |
|     scaled_base_top_offset_divided_by_two | 0 | ue(v) |
|     scaled_base_right_offset_divided_by_two | 0 | ue(v) |
|     scaled_base_bottom_offset_divided_by_two | 0 | ue(v) |
|   } | | |
| ...... | ... | ... |
|   rbsp_trailing_bits( ) | 0 | |
| } | | |

Slice Data Syntax in Scalable Extension

| slice_data_in_scalable_extension( ) { | C | Descriptor |
|---|---|---|
|   if( extended_spatial_scalability == 2 ) { | | |
|     scaled_base_left_offset_divided_by_two | 2 | ue(v) |
|     scaled_base_top_offset_divided_by_two | 2 | ue(v) |
|     scaled_base_right_offset_divided_by_two | 2 | ue(v) |
|     scaled_base_bottom_offset_divided_by_two | 2 | ue(v) |
|   } | | |
|   if( extended_spatial_scalability ) | | |
|     HalfSpatResBaseFlag = 0 | | |
|   else | | |
|     HalfSpatResBaseFlag = half_spat_res_base_pic( ) | | |
| ...... | ... | ... |
| } | | |

Macroblock Layer Syntax in Scalable Extension

| macroblock_layer_in_scalable_extension( ) { | C | Descriptor |
|---|---|---|
|   if( base_id_plus1 != 0 && adaptive_prediction_flag ) { | | |
|     base_mode_flag | 2 | ae(v) |
|     if( ! base_mode_flag && | | |
|       (HalfSpatResBaseFlag \|\| | | |
|       extended_spatial_scalability) && | | |
|       ! intra_base_mb( CurrMbAddr ) ) | | |
|     base_mode_refinement_flag | 2 | ae(v) |
|   } | | |
| ...... | ... | ... |
| } | | |

Semantics
Sequence Parameter Set Syntax in Scalable Extension extended_spatial_scalability specifies the presence of syntax elements related to geometrical parameters for the base layer upsampling. When extended_spatial_scalability is equal to 0, no geometrical parameter is present in the bitstream. When extended_spatial_scalability is equal to 1, geometrical parameters are present in the sequence parameter set. When extended_spatial_scalability is equal to 2, geometrical parameters are present in slice_data_in_scalable_extension. The value of 3 is reserved for extended_spatial_scalability. When extended_spatial_scalability is not present, it shall be inferred to be equal to 0.

scaled_base_left_offset_divided_by_two specifies half of the horizontal offset between the upper-left pixel of the upsampled base layer picture and the upper-left pixel of the current picture. When scaled_base_left_offset_divided_by_two is not present, it shall be inferred to be equal to 0.

scaled_base_top_offset_divided_by_two specifies half of the vertical offset of the upper-left pixel of the upsampled base layer picture and the upper-left pixel of the current picture. When scaled_base_top_offset_divided_by_two is not present, it shall be inferred to be equal to 0.

scaled_base_right_offset_divided_by_two specifies half of the horizontal offset between the bottom-right pixel of the upsampled based layer picture and the bottom-right pixel of the current picture. When scaled_base_right_offset_divided_by_two is not present, it shall be inferred to be equal to 0.

scaled_base_bottom_offset_divided_by_two specifies half of the vertical offset between the bottom-right pixel of the upsampled based layer picture and the bottom-right pixel of the current picture. When scaled_base_bottom_offset_divided_by_two is not present, it shall be inferred to be equal to 0.

All geometrical parameters are specified as unsigned integer in units of one-sample spacing relative to the luma sampling grid in the current layer. Several additional symbols (scaled_base_left_offset, scaled_base_top_offset, scaled_base_right_offset, scaled_base_bottom_offset, scaled_base_width, scaled_base_height) are then defined based on the geometrical parameters:

scaled_base_left_offset=2·scaled_base_left_offset_divided_by_two scaled_base_top_offset=2·scaled_base_top_offset_divided_by_two scaled_base_right_offset=2·scaled_base_right_offset_divided_by_two scaled_base_bottom_offset=2·scaled_base_bottom_offset_divided_by_two scaled_base_width=PicWidthInMbs·16−scaled_base_left_offset−scaled_base_right_offset scaled_base_height=PicHeightInMapUnits·16−scaled_base_top_offset−scaled_base_bottom_offset Slice Data Syntax in Scalable Extension Semantics of the syntax elements in the slice data are identical to that of the same syntax elements in the sequence parameter set.

Decoding Process

Decoding Process for Prediction Data

Compared to WD-1.0 [MPEG Doc. N6901], the following processes must be added. For each macroblock, the following applies:

If extended_spatial_scalability is equal to 1 or 2 and base_layer_mode_flag is equal to 1, the motion vector field including the macroblock partitioning is derived using the process described in Section 3. As in WD-1.0 [MPEG Doc. N6901], if all corresponding base-layer macroblocks are intra-coded, the current macroblock mode is set to I_BL.

else, if extended_spatial_scalability is equal to 1 or 2 and base_layer mode_flag is equal to 0 but base_layer_refinement is equal to 1, the base_layer refinement mode is signaled. The base_layer refinement mode is similar to the base_layer prediction mode. The macroblock partitioning as well as the reference indices and motion vectors are derived following Section 3. However, for each motion vector a quarter-sample motion vector refinement mvd_ref_1X (−1, 0, or +1 for each motion vector component) is additionally transmitted and added to the derived motion vectors. The rest of the process is identical as in WD-1.0 [MPEG Doc. N6901].

Decoding Process for Subband Pictures

Compared to WD-1.0 [MPEG Doc. N6901], the following processes must be added:

If extended_spatial_scalability is equal to 1 or 2, intra prediction signal for an MB in I_BL mode is generated by the following process.

The collocated base_layer blocks/macroblocks are filtered.

The intra prediction signal is generated by interpolating the deblocked. The interpolation is performed using process described in Section 4. The rest of the process is identical as in WD-1.0 [MPEG Doc. N6901].

Otherwise, if extended_spatial_scalability is equal to 1 or 2, and residual_prediction_flag is equal to 1, the following applies.

The residual signal of the base layer blocks is upsampled and added to the residual signal of the current macroblock. The interpolation is performed using process described in Section 4.

Changes to Loop Filter

When extended_spatial_scalability is equal to 1 or 2, a minor change should apply to the loop filter during filter strength decision for a block in I_BL mode.

If the neighboring block is intra-coded but not in I_BL mode, the Bs is 4 (this first part is as same as in WD-1.0 [MPEG Doc. N6901]).

Otherwise, if any of the adjacent blocks has coefficient, the Bs is 2.

Otherwise, if the neighboring block is not in I_BL mode, the Bs is 1.

Otherwise, Bs is 0.

6-Tap Filter Embodiments

Some embodiments of the present invention are designed for use with the Scalable Video Coding extension of H.264/MPEG-4 AVC, especially for the Extended Spatial Scalable (ESS) video coding feature adopted in April 2005 by JVT (Joint Video Team of MPEG and VCEG).

In the current SVC design, the upsampling process is based on the quarter luma sample interpolation procedure that is specified in H.264 for inter prediction. The method inherits two drawbacks when applied to spatial scalable coding: (1) the interpolation resolution is limited to quarter samples, and (2) the half sample interpolation must be performed in order to get to a quarter sample position.

Some embodiments of the present invention remove these drawbacks by (1) finer interpolation resolution, and (2) direct interpolation. Consequently, these embodiments reduce the computational complexity while improving the quality of the up-sampled pictures.

The upsampling technique of exemplary embodiments of the present invention is based on direct interpolation with 16 6-tap filters. The filter selection is according to the interpolation positions or phases, ranging from 0 to 15 in units of one-sixteenth picture samples. The set of filters are designed to be backward compatible with the half sample interpolation process of SVC and the half sample luma inter prediction of H.264. Therefore, the technique of these embodiments can be a natural extension of H.264 from hardware/software implementation point of view.

Conventional spatial scalable video coding systems typically deal with cases in which spatial or resolution scaling-factor is 2 or a power of 2. In April 2005, Extended Spatial Scalability was adopted into SVC Joint Scalable Video Model (JSVM) to handle more generic applications in which spatial scaling factor is not limited to the power of 2. The upsampling procedure for inter-layer texture prediction, however, is still a developing issue. During the JVT meeting in April 2005, a decision was made to temporarily adopt the quarter luma sample interpolation process specified in H.264 for texture upsampling.

In these embodiments of the present invention, the same geometric relationships that were described for the above-described embodiments in relation to FIG. 1 apply as well.

In above-described embodiments, a set of 16 4-tap upsampling filters were defined for the 16 different interpolation phases in units of one-sixteenth sample spacing relative to the integer sample grid of corresponding component in the base layer picture. The 4-tap filters, however, are not backward compatible to the earlier H.264 design. Consequently, these embodiments may comprise a new set of 16 6-tap filters and corresponding filtering procedures. In an exemplary embodiment, the 6-tap filters described in Table 2 may be used. In another exemplary embodiment, the 6-tap filters described in Table 3 may be used.

TABLE 2

First exemplary 16-phase interpolation filter (6-tap) interpolation filter coefficients

| phase | e[−2] | e[−1] | e[0] | e[1] | e[2] | e[3] |
|---|---|---|---|---|---|---|
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |
| 3 | 1 | −4 | 30 | 7 | −2 | 0 |
| 4 | 1 | −4 | 28 | 9 | −2 | 0 |
| 5 | 1 | −5 | 27 | 11 | −3 | 1 |
| 6 | 1 | −5 | 25 | 14 | −3 | 0 |
| 7 | 1 | −5 | 22 | 17 | −4 | 1 |
| 8 | 1 | −5 | 20 | 20 | −5 | 1 |
| 9 | 1 | −4 | 17 | 22 | −5 | 1 |
| 10 | 0 | −3 | 14 | 25 | −5 | 1 |
| 11 | 1 | −3 | 11 | 27 | −5 | 1 |
| 12 | 0 | −2 | 9 | 28 | −4 | 1 |
| 13 | 0 | −2 | 7 | 30 | −4 | 1 |
| 14 | 0 | −1 | 4 | 31 | −3 | 1 |
| 15 | 0 | 0 | 2 | 32 | −2 | 0 |

TABLE 3

Second exemplary 16-phase interpolation filter (6-tap) interpolation filter coefficients

| phase | e[−2] | e[−1] | e[0] | e[1] | e[2] | e[3] |
|---|---|---|---|---|---|---|
| 0 | 0 | 0 | 32 | 0 | 0 | 0 |
| 1 | 0 | −2 | 32 | 2 | 0 | 0 |
| 2 | 1 | −3 | 31 | 4 | −1 | 0 |
| 3 | 1 | −4 | 30 | 6 | −1 | 0 |
| 4 | 1 | −4 | 28 | 9 | −2 | 0 |
| 5 | 1 | −4 | 27 | 11 | −3 | 0 |
| 6 | 1 | −5 | 25 | 14 | −3 | 0 |
| 7 | 1 | −5 | 22 | 17 | −4 | 1 |
| 8 | 1 | −5 | 20 | 20 | −5 | 1 |
| 9 | 1 | −4 | 17 | 22 | −5 | 1 |
| 10 | 0 | −3 | 14 | 25 | −5 | 1 |
| 11 | 0 | −3 | 11 | 27 | −4 | 1 |
| 12 | 0 | −2 | 9 | 28 | −4 | 1 |
| 13 | 0 | −1 | 6 | 30 | −4 | 1 |
| 14 | 0 | −1 | 4 | 31 | −3 | 1 |
| 15 | 0 | 0 | 2 | 32 | −2 | 0 |

Given a luma sample position (x, y) in the enhancement picture in units of integer luma samples, its corresponding position in the base picture ($p_{x,L}$, $p_{y,L}$) in units of one-sixteenth luma samples of the base picture can be derived as $$\begin{cases} p_{x,L}(x) = \left[(x - x_{orig}) \cdot w_{base} \cdot R_L + \frac{R_L}{2}(w_{base} - w_{extract})\right] // w_{extract} \\ p_{y,L}(y) = \left[(y - y_{orig}) \cdot h_{base} \cdot R_L + \frac{R_L}{2}(h_{base} - h_{extract})\right] // h_{extract} \end{cases} \quad (21)$$

in which $R_L=16$ (for one-sixteenth-sample resolution interpolation), as in FIG. 23 ($x_{orig}$, $y_{orig}$) represents the position of the upper-left corner of the cropping window in the current picture in units of single luma samples of current picture, ($w_{base}$, $h_{base}$) is the resolution of the base picture in units of single luma samples of the base picture, ($w_{extract}$, $h_{extract}$) is the resolution of the cropping window in units of the single luma samples of current picture, and "//" represents a simplified division operator.

Similarly, given a chroma sample position ($x_c$, $y_c$) in the enhancement picture in units of single chroma samples, its corresponding position in the base picture ($p_{x,c}$, $p_{y,c}$) in units of one-sixteenth chroma samples of the base picture can be derived as $$\begin{cases} p_{x,c}(x_c) = \dfrac{\left[(x_c - x_{orig,c}) \cdot w_{base,c} \cdot R_C + \dfrac{R_C}{4}(2 + p_{enh,x})\right]}{w_{base,c} - \dfrac{R_C}{4}(2 + p_{base,x})w_{extract,c}} // w_{extract,c} \\ p_{y,c}(y_c) = \dfrac{\left[(y_c - y_{orig,c}) \cdot h_{base,c} \cdot R_C + \dfrac{R_C}{4}(2 + p_{enh,y})\right]}{h_{base,c} - \dfrac{R_C}{4}(2 + p_{base,y})h_{extract,c}} // h_{extract,c} \end{cases} \quad (22)$$

in which $R_c=16$, ($x_{orig,c}$, $y_{orig,c}$) represents the position of the upper-left corner of the cropping window in the current picture in units of single chroma samples of current picture, ($w_{base,c}$, $h_{base,c}$) is the resolution of the base picture in units of single chroma samples of the base picture, ($w_{extract,c}$, $h_{extract,c}$) is the resolution of the cropping window in units of the single chroma samples of current picture, ($p_{base,x}$, $p_{base,y}$) represents the relative chroma phase shift of the base picture in units of quarter chroma samples of the base picture, and ($p_{enh,x}$, $p_{enh,y}$) represents the relative chroma phase shift of the current picture in units of quarter chroma samples of the current picture.

A 6-tap filter can be selected from Table 2 or Table 3 based on the interpolation positions derived by Eqs. 21 and 22. In some embodiments, when the interpolation position is a half sample position, the filter is as same as that in H.264 defined for half luma sample interpolation. Therefore, the similar hardware/software modules can be applied for the technique of these embodiments of the present invention.

For inter-layer residual upsampling, similar direct interpolation methods can be used. In some embodiments, bilinear interpolation filters may be used instead of the 6-tap filters for texture upsampling or the 4-tap filters described above.

In some exemplary embodiments, an interpolation process is as follows.

1. Define position (xP, yP) for the upper-left luma sample of a macroblock in the enhancement picture. When chroma_format_idc is not equal to 0, i.e., the chroma channels exist, define position (xC, yC) for the upper-left chroma samples of the same macroblock.

2. Derive the relative location of the macroblock in the base-layer picture, $$\begin{cases} xB = p_{x,L}(xP) >> 4 \\ yB = p_{y,L}(yP) >> 4 \end{cases} \quad (23)$$

$$\begin{cases} xB1 = (p_{x,L}(xP+15)+15) >> 4 \\ yB1 = (p_{y,L}(yP+15)+15) >> 4 \end{cases} \quad (24)$$

and when chroma_format_idc is not equal to 0, $$\begin{cases} xCB = p_{x,C}(xC) >> 4 \\ yCB = p_{y,C}(yC) >> 4 \end{cases} \quad (25)$$

$$\begin{cases} xCB1 = (p_{x,C}(xC + MbWidthC - 1) + 15) >> 4 \\ yCB1 = (p_{y,C}(yC + MbHeightC - 1) + 15) >> 4 \end{cases} \quad (26)$$

in which MbWidthC and MbHeightC represent the number of chroma samples per MB in horizontal and vertical directions, respectively.

3. Texture Interpolation Process
Inputs to this process include
  integer luma sample positions in base picture (xB, yB) and (xB1, yB1)
  a luma sample array for the base picture $base_L[x, y]$ with x=−2+xB . . . (xB1+2) and y=−2+yB . . . (yB1+2)
  when chroma_format_idc is not equal to 0,
    integer chroma sample positions in base picture (xCB, yCB) and (xCB1, yCB1)
    two chroma sample arrays for the base picture $base_{Cb}[x, y]$ and $base_{Cr}[x, y]$ with x=−2+xCB . . . (xCB1+2) and y=−2+yCB . . . (yCB1+2)
Outputs of this process include
  a luma sample macroblock array $pred_L[x, y]$ with x=0 . . . 15 and y=0 . . . 15
  when chroma_format_idc is not equal to 0, two chroma sample macroblock arrays $pred_{Cb}[x, y]$ and $pred_{Cr}[x, y]$ with x=0 . . . MbWidthC−1 and y=0 . . . MbHeightC−1
The luma samples $pred_L[x, y]$ with x=0 . . . 15 and y=0 . . . 15 are derived as follows.
  Let $temp_L[x, y]$ with x=−2+xB . . . (xB1+2) and y=0 . . . 15 be a temporary luma sample array.
  Each $temp_L[x, y]$ with x=−2+xB . . . (xB1+2) and y=0 . . . 15 is derived as follows
    The corresponding fractional-sample position yf in base layer is derived as follows.

$yf = p_{y,L}(y + yP)$

Let yInt and yFrac be defined as follows $y\text{Int} = (yf >> 4)$ $y\text{Frac} = yf \% 16$ Select a six-tap filter e[j] with j=−2 . . . 3 from Table 2 using yFrac as phase, and derive $temp_L[x, y]$ as $temp_L[x, y] = base_L[x, y\text{Int} - 2] * e[-2] + base_L[x, y\text{Int} - 1] * e[-1] +$
$base_L[x, y\text{Int}] * e[0] + base_L[x, y\text{Int} + 1] * e[1] +$
$base_L[x, y\text{Int} + 2] * e[2] + base_L[x, y\text{Int} + 3] * e[3]$ Each sample $pred_L[x, y]$ with x=0 . . . 15 and y=0 . . . 15 is derived as follows.
    The corresponding fractional-sample position xf in base layer is derived as follows.

$xf = p_{x,L}(x + xP)$

Let xInt and xFrac be defined as follows $x\text{Int} = (xf >> 4)$ $x\text{Frac} = xf \% 16$ Select a six-tap filter e[j] with j=−2 . . . 3 from Table 2 using xFrac as phase, and derive $pred_L[x, y]$ as $pred_L[x, y] = \text{Clip1}_Y((temp_L[x\text{Int}-2, y] * e[-2] + temp_L[x\text{Int}-1, y] * e[-1] +$
$temp_L[x\text{Int}, y] * e[0] + temp_L[x\text{Int}+1, y] * e[1] +$
$temp_L[x\text{Int}+2, y] * e[2] + temp_L[x\text{Int}+3, y] * e[3] + 512) / 1024)$ When chroma_format_idc is not equal to 0, the chroma samples $pred_C[x, y]$ (with C being Cb or Cr) with x=0 . . . MbWidthC−1, y=0 . . . MbHeightC−1 are derived as follows.
  Let $tmp1_{Cb}[x\ y]$ and $tmp1_{Cr}[x, y]$ with x=−2+xCB . . . (xCB1+2) and y=0 . . . MbHeightC−1 be temporary chroma sample arrays.
  Each $temp_C[x, y]$ with C as Cb and Cr, x=−2+xCB . . . (xCB1+2), and y=0 . . . MbHeightC−1 is derived as follows
    The corresponding fractional-sample position yfC in base layer is derived as follows.

$yfC = p_{y,C}(y + yC)$

Let yIntC and yFracC be defined as follows $y\text{IntC} = (yfC >> 4)$ $y\text{FracC} = yfC \% 16$ Select a six-tap filter e[j] with j=−2 . . . 3 from Table 2 using yFracC as phase, and derive $temp_C[x, y]$ as $temp_C[x, y] = base_C[x, y\text{IntC} - 2] * e[-2] + base_C[x, y\text{IntC} - 1] * e[-1] +$
$base_C[x, y\text{IntC}] * e[0] + base_C[x, y\text{IntC} + 1] * e[1] +$
$base_C[x, y\text{IntC} + 2] * e[2] + base_C[x, y\text{IntC} + 3] * e[3]$ Each sample $pred_C[x, y]$ with C as Cb and Cr, x=0 . . . MbWidthC−1 and y=0 . . . MbHeightC−1 is derived as follows.
    The corresponding fractional-sample position xfC in base layer is derived as follows.

$xfC = p_{x,C}(x + xC)$

Let xIntC and xFracC be defined as follows $x\text{IntC} = (xfC >> 4)$ $x\text{FracC} = xfC \% 16$ Select a six-tap filter e[j] with j=−2 . . . 3 from Table 2 using xFracC as phase, and derive $pred_C[x, y]$ as $pred_C[x, y] = \text{Clip1}_C((temp_C[x\text{IntC}-2, y] * e[-2] + temp_C[x\text{IntC}-1, y] * e[-1] + temp_C[x\text{IntC}, y] * e[0] + temp_C[x\text{IntC}+1, y] * e[1] + temp_C[x\text{IntC}+2, y] * e[2] + temp_C[x\text{IntC}+3, y] * e[3] + 512) / 1024)$ 4. Texture Interpolation Process
Inputs to this process include
  integer luma sample positions in basePic (xB, yB) and (xB1, yB1)
  a luma residual sample array $resBase_L[x, y]$ with x=− xB . . . xB1 and y=yB . . . yB1
  when chroma_format_idc is not equal to 0,
    integer chroma sample positions in basePic (xCB, yCB) and (xCB1, yCB1)

two chroma residual sample arrays $resBase_{Cb}[x, y]$ and $resBase_{Cr}[x, y]$ with x=xCB . . . xCB1 and y=yCB . . . yCB1

Outputs of this process include a luma sample array $resPred_L[x, y]$ with x=0 . . . 15 and y=0 . . . 15 when chroma_format_idc is not equal to 0, two chroma sample arrays $resPred_{Cb}[x, y]$ and $resPred_{Cr}[x, y]$ with x=0 . . . MbWidthC−1 and y=0 . . . MbHeightC−1

The luma residual samples $resPred_L[x, y]$ with x=0 . . . 15 and y=0 . . . 15 are derived as follows.

Let $temp_L[x, y]$ with x=xB . . . xB1 and y=0 . . . 15 be a temporary luma sample array.

Each $temp_L[x, y]$ with x=−xB . . . xB1 and y=0 . . . 15 is derived as follows

The corresponding fractional-sample position yf in base layer is derived as follows.

$yf = p_{y,L}(y + yP)$

Let yInt and yFrac be defined as follows $yInt = (yf >> 4)$ $yFrac = yf \% 16$

Derive $temp_L[x, y]$ as $temp_L[x, y]$ 32 $resBase_L[x, yInt]*(16 - yFrac) + resBase_L[x, yInt+1]*yFrac$ Each residual sample $resPred_L[x, y]$ with x=0 . . . 15 and y=0 . . . 15 is derived as follows.

The corresponding fractional-sample position xf in base layer is derived as follows.

$xf = p_{x,L}(x + xP)$

Let xInt and xFrac be defined as follows $xInt = (xf >> 4)$ $xFrac = xf \% 16$

Derive $resPred_L[x, y]$ as $resPred_L[x, y] = Clip1_{Y,r}((temp_L[xInt, y]*(16 - xFrac) + temp_L[xInt+1, y]*xFrac)/256)$ with $Clip1_{Y,r}(x) = Clip3(1 - (1 << BitDepth_Y), (1 << BitDepth_Y) - 1, x)$ in which $BitDepth_Y$ represents the bit depth of the luma channel data.

When chroma_format_idc is not equal to 0, the chroma residual samples $resPred_C[x, y]$ (with C being Cb or Cr) with x=0 . . . MbWidthC−1, y=0 . . . MbHeightC−1 are derived as follows.

Let $tmp1_{Cb}[x, y]$ and $tmp1_{Cr}[x, y]$ with x=xCB . . . xCB1 and y=0 . . . MbHeightC−1 be temporary chroma sample arrays.

Each $temp_C[x, y]$ with C as Cb and Cr, x=−xCB . . . xCB1, and y=0 . . . MbHeightC−1 is derived as follows The corresponding fractional-sample position yfC in base layer is derived as follows.

$yfC = p_{y,C}(y + yC)$

Let yIntC and yFracC be defined as follows $yIntC = (yfC >> 4)$ $yFracC = yfC \% 16$ Derive $temp_C[x, y]$ as $temp_C[x, y] = resBase_C[x, yIntC]*(16 - yFracC) + resBase_C[x, yIntC+1]*yFracC$ Each sample $respred_C[x, y]$ with C as Cb and Cr, x=0 . . . MbWidthC−1 and y=0 . . . MbHeight−1 is derived as follows.

The corresponding fractional-sample position xfC in base layer is derived as follows.

$xfC = p_{x,C}(x + xC)$

Let xIntC and xFracC be defined as follows $xIntC = (xfC >> 4)$ $xFracC = xfC \% 16$ Derive $resPred_C[x, y]$ as $resPred_C[x, y] = Clip1_{C,r}(temp_C[xIntC, y]*(16 - xFracC) + temp_C[xIntC+1, y]*xFracC)/256)$ with $Clip1_{C,r}(x) = Clip3(1 - (1 << BitDepth_C), (1 << BitDepth_C) - 1, x)$ in which $BitDepth_C$ represents the bit depth of the chroma channel data.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or described features can be implemented by themselves, or in combination with other operations in either hardware or software.

The terms and expressions which have been employed in the forgoing specification are used therein as terms of description and not of limitation, and there is no intention in the use of such terms and expressions of excluding equivalence of the features shown and described or portions thereof, it being recognized that the scope of the invention is defined and limited only by the claims which follow.

I claim:

1. A method for picture-level adaptation in a spatially-scalable video codec, said method comprising:
   a) receiving a definition of a first cropping window at a first location in a first picture of an input video sequence;
   b) generating a first base layer corresponding to said first cropping window;
   c) receiving a definition of a second cropping window at a second location, not coincident to said first location, in a second picture of said input video sequence; and
   d) generating a second base layer corresponding to said second cropping window; and
   e) predicting an area of said second picture in said second cropping window by adjusting a motion vector to account for the difference between said first location of said first cropping window and said second location of said second cropping window.

2. A method as described in claim 1 further comprising predicting an enhancement layer for said second picture based on said second base layer.

3. A method as described in claim 2 wherein said predicting comprises use of a scaled motion vector having an image motion vector component and a cropping window motion vector component.

4. A method as described in claim 2 wherein said predicting comprises a motion vector $mv=(d_x, d_y)$ that is scaled in the vector $mv_s=(d_{sx}, d_{sy})$ using the following equations:

$$\begin{cases} d_{sx} = (d_x \cdot w_{extract} + \text{sign}[d_x] \cdot w_{base}/2)/w_{base} + 4 \cdot (x_{orig,r} - x_{orig}) \\ d_{sy} = (d_y \cdot h_{extract} + \text{sign}[d_y] \cdot h_{base}/2)/h_{base} + 4 \cdot (y_{orig,r} - y_{orig}) \end{cases}$$

wherein $w_{extract}$ and $h_{extract}$ are the width and height, respectively, of a sub-region of an enhancement layer picture, $w_{base}$ and $h_{base}$ are the width and height, respectively, of a base layer picture corresponding to the sub-region of the enhancement layer picture, $x_{orig}$ and $y_{orig}$ are the coordinates of the origin of the sub-region of the enhancement layer picture, $x_{orig,r}$ and $y_{orig,r}$ are the coordinates of the origin of the entire enhancement layer picture and wherein sign[x] is equal to 1 when x is positive, (−1) when x is negative, and 0 when x equals.

5. A method as described in claim 2 wherein said first picture and said second picture are texture pictures.

6. A method as described in claim 2 wherein said first picture and said second picture are residual pictures.

7. A method for predicting an enhancement layer area, defined by a user-defined, cropping window, from a base layer in a spatially-scalable video codec, said method comprising:
   a) receiving a first location for a user-defined, cropping window in said enhancement layer of a frame of said spatially-scalable video codec;
   b) calculating a base-layer motion vector in a direction for an image block in said base layer;
   c) scaling said base-layer motion vector based on the ratio of a dimension of said cropping window in said direction to a dimension of said base layer in said direction; and
   d) adjusting said scaled motion vector to account for said location of said cropping window relative to said base layer.

8. A method as described in claim 7 further comprising predicting said enhancement layer using said adjusted, scaled motion vector.

9. A method as described in claim 7 wherein said scaling and said adjusting are performed in two orthogonal directions.

10. A method as described in claim 7 wherein said scaling and said adjusting are performed on a motion vector $mv=(d_x, d_y)$ that is adjusted and scaled in the vector $mv_s=(d_{sx}, d_{sy})$ using the following equations:

$$\begin{cases} d_{sx} = (d_x \cdot w_{extract} + \text{sign}[d_x] \cdot w_{base}/2)/w_{base} + 4 \cdot (x_{orig,r} - x_{orig}) \\ d_{sy} = (d_y \cdot h_{extract} + \text{sign}[d_y] \cdot h_{base}/2)/h_{base} + 4 \cdot (y_{orig,r} - y_{orig}) \end{cases}$$

wherein $w_{extract}$ and $h_{extract}$ are the width and height, respectively, of a sub-region of an enhancement layer picture, $w_{base}$ and $h_{base}$ are the width and height, respectively, of a base layer picture corresponding to the sub-region of the enhancement layer picture, $x_{orig}$ and $y_{orig}$ are the coordinates of the on in of the sub-region of the enhancement layer picture, $x_{orig,r}$ and $y_{orig,r}$ are the coordinates of the origin of the entire enhancement layer picture and wherein sign[x] is equal to 1 when x is positive, (−1) when x is negative, and 0 when x equals.

11. A method as described in claim 7 wherein said prediction comprises textural prediction.

12. A method as described in claim 7 wherein said prediction comprises residual prediction.

13. A method as described in claim 7 wherein said scaling and said adjusting are applied to a all motion vectors of a prediction macroblock MB_pred.

14. A system for predicting an enhancement layer area, defined by a user-defined cropping window, from a base layer in a spatially-scalable video codec, said system comprising:
   a) a computing device for calculating a base-layer motion vector in a direction for an image block in said base layer;
   b) said computing device further comprising a scaling function for scaling said base-layer motion vector based on the ratio of a dimension of said user-defined, image-content-independent cropping window in said direction to a dimension of said base layer in said direction; and
   c) said computing device further comprising an adjusting function for adjusting said scaled motion vector to account for motion of said user-defined, cropping window from a location of a second user-defined, cropping window in a reference picture from which said predicting is being performed.

15. A method as described in claim 14 further comprising a predictor for predicting an enhancement layer using said adjusted, scaled motion vector.

16. A method as described in claim 14 wherein said scaling and said adjusting are each performed in two orthogonal directions.

17. A method as described in claim 14 wherein said scaling and said adjusting are performed on a motion vector $mv=(d_x, d_y)$ that is adjusted and scaled in the vector $mv_s=(d_{sx}, d_{sy})$ using the following equations:

$$\begin{cases} d_{sx} = \frac{(d_x \cdot w_{extract} + \text{sign}[d_x] \cdot w_{base}/2)}{w_{base}} + 4 \cdot (x_{orig,r} - x_{orig}) \\ d_{sy} = \frac{(d_y \cdot h_{extract} + \text{sign}[d_y] \cdot h_{base}/2)}{h_{base}} + 4 \cdot (y_{orig,r} - y_{orig}) \end{cases}$$

wherein $w_{extract}$ and $h_{extract}$ are the width and height, respectively, of a sub-region of an enhancement layer picture, $w_{base}$ and $h_{base}$ are the width and height, respectively, of a base layer picture corresponding to the sub-region of the enhancement layer picture, $x_{orig}$ and $y_{orig}$ are the coordinates of the origin of the sub-region of the enhancement layer picture, $x_{orig,r}$ and $y_{orig,r}$ are the coordinates of the origin of the entire enhancement layer picture and wherein sign[x] is equal to 1 when x is positive, (−1) when x is negative, and 0 when x equals.

18. A method as described in claim 14 wherein said prediction comprises textural prediction.

19. A method as described in claim 14 wherein said prediction comprises residual prediction.

20. A method as described in claim 14 wherein said scaling and said adjusting are applied to a all motion vectors of a prediction macroblock MB_pred.

* * * * *